US008445595B2

(12) United States Patent
Radermacher et al.

(10) Patent No.: US 8,445,595 B2
(45) Date of Patent: *May 21, 2013

(54) POLYPROPYLENE PREPARED WITH A SINGLE-SITE CATALYST AND POLY(HYDROXYL CARBOXYLIC ACID) BLENDS

(75) Inventors: Fabienne Radermacher, Obaix (BE); Alain Standaert, Brussels (BE); Geert Snellings, Sint-Lievens-Houtem (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 11 days.

This patent is subject to a terminal disclaimer.

(21) Appl. No.: 12/674,516

(22) PCT Filed: Aug. 25, 2008

(86) PCT No.: PCT/EP2008/061098
§ 371 (c)(1),
(2), (4) Date: May 19, 2011

(87) PCT Pub. No.: WO2009/027378
PCT Pub. Date: Mar. 5, 2009

(65) Prior Publication Data
US 2011/0251333 A1    Oct. 13, 2011

(30) Foreign Application Priority Data

Aug. 24, 2007 (EP) .................................... 07114921
Aug. 24, 2007 (EP) .................................... 07114924

(51) Int. Cl.
*C08F 8/00* (2006.01)
(52) U.S. Cl.
USPC ............................ 525/191; 525/411; 525/419
(58) Field of Classification Search
USPC ......................... 525/191, 411, 419
See application file for complete search history.

(56) References Cited

U.S. PATENT DOCUMENTS

| 5,216,050 | A | 6/1993 | Sinclair | |
|---|---|---|---|---|
| 6,797,779 | B1 | 9/2004 | Ajbani et al. | |
| 7,847,021 | B2 | 12/2010 | Shinoda et al. | |
| 7,947,754 | B2 * | 5/2011 | Okuda et al. | 521/134 |
| 8,137,773 | B2 | 3/2012 | Hiruma et al. | |
| 8,268,913 | B2 | 9/2012 | Li et al. | |
| 2004/0044107 | A1 | 3/2004 | Kikuchi et al. | |
| 2005/0245686 | A1 * | 11/2005 | Stevens et al. | 525/191 |
| 2007/0037914 | A1 | 2/2007 | Heck et al. | |
| 2007/0122613 | A1 | 5/2007 | Stevens | |
| 2007/0173603 | A1 | 7/2007 | Murakami | |
| 2008/0249227 | A1 | 10/2008 | Ueda et al. | |
| 2009/0023861 | A1 * | 1/2009 | Shimakage et al. | 525/89 |
| 2010/0239800 | A1 | 9/2010 | Ikeda et al. | |
| 2011/0184115 | A1 | 7/2011 | Debras et al. | |
| 2011/0263776 | A1 | 10/2011 | Debras et al. | |

FOREIGN PATENT DOCUMENTS

| EP | 1719803 | 11/2006 |
|---|---|---|
| EP | 1777263 | 4/2007 |
| JP | 10-251498 A | 9/1998 |
| JP | 2001-270924 A | 10/2001 |
| JP | 2005-232228 A | 9/2005 |
| JP | 2005-281424 A | 10/2005 |
| JP | 2006-321988 A | 11/2006 |
| JP | 2008-149986 A | 7/2008 |

OTHER PUBLICATIONS

G. Joseph Ray, et al.; "Carbon-13 Nuclear Magnetic Resonance Determination of Monomer Composition and Sequence Distributions in Ethylene-Propylene Copolymers Prepared With a Stereoregular Catalyst System"; Ethylene-Propylene Copolymers, vol. 10, No. 4; Jul.-Aug. 1977; pp. 773-778.

* cited by examiner

*Primary Examiner* — Peter D Mulcahy (57) ABSTRACT

A resin composition comprising at least 0.1% by weight of poly(hydroxy carboxylic acid) and at least 50% by weight of polypropylene prepared with a single-site catalyst, preferably with a metallocene catalyst.

16 Claims, 3 Drawing Sheets

POLYPROPYLENE PREPARED WITH A SINGLE-SITE CATALYST AND POLY(HYDROXYL CARBOXYLIC ACID) BLENDS

CROSS-REFERENCE TO RELATED APPLICATIONS

This application claims the benefit of PCT/EP2008/061098, filed Aug. 25, 2008, which claims priority from EP 07114924.9, filed Aug. 24, 2007 and EP 07114921.5, filed Aug. 24, 2007.

FIELD OF THE INVENTION

This invention is related to blends of poly(hydroxy carboxylic acid)s with polypropylene. In particular the invention is directed to blends of poly(lactic acid) with polypropylene prepared with single-site catalysts, preferably metallocene catalysts.

BACKGROUND OF THE INVENTION

In the past few years, the general public has become increasingly apprehensive of the impact man-made waste has on the environment. Hence there is a growing interest in developing novel biodegradable (and preferably compostable) plastics from renewable resources.

One particularly interesting candidate for this task is poly (hydroxy carboxylic acid), in particular poly(lactic acid) (PLA), now commercially available on a relatively large scale. The lactic acid is obtained from plants such as corn and sugar-cane or other sugar- or starch-producing plants. Not only is PLA obtainable from renewable materials, it is also industrially compostable. For these reasons, there is significant interest in using PLA as a substitute in applications, where petroleum-based thermoplastics have conventionally been used.

Unfortunately, PLA used on its own does not have the same advantageous properties as conventional plastics do. In particular PLA has performance problems related to heat resistance, brittleness and limited flexibility, resulting in poor mechanical strength. On the other hand, polyolefins, such as polypropylene, have much better mechanical properties. It has been attempted to combine these properties by blending PLA with polypropylene to obtain a resin that is at least partially obtainable from renewable resources, but still has acceptable mechanical properties. However, it is known that blending PLA with conventional polypropylenes such as Ziegler-Natta-catalysed polypropylenes provides heterogeneous resin blends, due to the differences in polarity and molecular weight distribution of the two components. In the past, compatibilising agents were used to increase the homogeneity of the blends. However, this requires an additional industrial step, as well as specific conditions during extrusion. Furthermore, the addition of compatibilising agents is expensive and changes the properties of the desired product. Thus both the compatibilising agent and the by-products change the properties of the desired end product, be it a film, fibre or moulded object.

JP 2005307128 A discloses a blend of PLA and polypropylene using a compatibilising agent, in this case a polypropylene grafted with a vinyl carboxylic acid, vinyl anhydride or another vinyl derivative.

JP 2006348060 A also describes a thermoplastic resin comprising from 20-90 wt % PLA and 10-80 wt % polypropylene with 1-20 pts.wt of compatibiliser.

EP 1 777 263 A also teaches mixing polyolefins with PLA by using a compatibiliser, wherein the compatibiliser is a hydrogenated, diene-based polymer containing at least one functional group selected from carboxyl group, acid anhydride group, epoxy group, (meth)acryl group, amino group, alkoxysilyl group, hydroxyl group, isocyanate group and oxazoline group.

US 2005/0192405 A discloses a polymer blend of PLA and polyolefins. The two components are mixed by including a polyalkylacrylic ester and/or a polyvinyl ester, as well as a block copolymer of a polyalkylacrylic ester and a polyolefin and/or a block copolymer of a polyvinyl ester and a polyolefin, which act as compatibilising agents.

It is hence an object of the invention to develop a polypropylene-based resin, that is at least partially obtainable from renewable resources and has better or at least similar mechanical properties than hitherto known blends of polypropylene with resins obtainable from renewable resources.

It is also an object of the invention to develop a resin that is at least partially obtainable from renewable resources and has improved mechanical properties in comparison with poly (hydroxy carboxylic acid)s.

Additionally, it is an object of the invention to develop a resin that is at least partially obtainable from renewable resources and has similar mechanical properties to polypropylene.

It is hence an object of the invention to develop a resin that has better gas barrier properties than polypropylene.

It is also an object of the invention to develop a resin with better surface tension properties than polypropylene.

Furthermore, it is an object of the invention to blend polypropylene with poly(hydroxy carboxylic acid)s without having to use compatibilising agents to obtain homogeneous blends.

It is also an object of the invention to find a resin at least partially obtainable from renewable resources that can be used in film, fibre, thermoforming, blow moulding, injection stretch blow moulding, extrusion blow moulding or rotational moulding applications.

At least one of the above objects is achieved with the implementation of the current invention.

SUMMARY OF THE INVENTION

The present invention solves at least one of the problems mentioned above by providing a resin composition comprising at least 0.1% and less than 50% by weight of poly(hydroxy carboxylic acid) and at least 50% by weight of polypropylene prepared with a single-site catalyst, in particular metallocene catalysts.

According to another embodiment, the resin composition comprises more than 50% by weight of polypropylene prepared with a single-site catalyst, in particular metallocene catalysts.

According to another embodiment, the resin composition essentially consists of poly(hydroxy carboxylic acid) and polypropylene prepared with a single-site catalyst, in particular metallocene catalysts.

The invention also covers the process for making the resin composition of the present invention.

Furthermore, the invention covers the use of poly(hydroxy carboxylic acids) to change the properties of polypropylene prepared with single-site catalysts, for example metallocene catalysts.

The invention also includes the use of polypropylene resin, in particular, polypropylene prepared with a single-site catalyst, as an impact resistance modifier for poly(hydroxy carboxylic acid)s.

DETAILED DESCRIPTION OF THE INVENTION

As described above the present invention relates to a composition comprising a resin blend of poly(hydroxy carboxylic acid) and polypropylene prepared with a single-site catalyst, in particular metallocene catalysts.

Until now, it has been assumed that it would be impossible to achieve homogeneous blends of poly(hydroxy carboxylic acid)s and polypropylene without using a compatibilising agent, especially in view of the difference in polarities. However, surprisingly this is not the case. In fact, the blends are sufficiently homogeneous and provide surprisingly acceptable properties, such that they can be used in compositions for films, fibres, thermoforming, injection blow moulding, extrusion blow moulding, injection stretch blow moulding and rotational blow moulding and the like. It is thought that the more similar the molecular structure of the two components, the more miscible they become, despite differences in polarity.

The Poly(Hydroxy Carboxylic Acid)

The poly(hydroxy carboxylic acid) can be any polymer wherein the monomers are derived from renewable resources and comprise at least one hydroxyl group and at least carboxyl group. The hydroxy carboxylic acid monomer is preferably obtained from renewable resources such as corn and sugar cane or other sugar- or starch-producing plants. Preferably, the poly(hydroxy carboxylic acid) used according to the invention is at least partially obtainable from renewable resources. The term "poly(hydroxy carboxylic acid)" includes homo- and co-polymers herein as well as blends of one or more such polymers.

The poly(hydroxy carboxylic acid) can be represented as in Formula I:

Formula I wherein
R9 is hydrogen or a branched or linear alkyl comprising from 1 to 12 carbon atoms;
R10 is optional and can be a branched, cyclic or linear alkylene chains comprising from 1 to 12 carbon atoms; and
"r" represents the number of repeating units of R and is any integer from 30 to 15000.

The monomeric repeating unit is not particularly limited, as long as it is aliphatic and has a hydroxyl residue and a carboxyl residue. Examples of possible monomers include lactic acid, glycolic acid, 3-hydroxybutyric acid, 4-hydroxybutyric acid, 4-hydroxyvaleric acid, 5-hydroxyvaleric acid and 6-hydroxycaproic acid to make for example poly(lactic acid), poly(glycolic acid), poly(3-hydroxybutyric acid), poly(4-hydroxybutyric acid), poly(4-hydroxyvaleric acid), poly(5-hydroxyvaleric acid) and poly(6-hydroxycaproic acid), respectively.

The monomeric repeating unit may also be derived from a cyclic monomer or cyclic dimer of the respective aliphatic hydroxycarboxylic acid. Examples of these include lactide, glycolide, β-propiolactone, β-butyrlactone, γ-butyrolactone, γ-valerolactone, δ-valerolactone, ε-caprolactone and the like.

In the case of asymmetric carbon atoms within the hydroxy carboxylic acid unit, each of the D-form and the L-form as well as mixtures of both may be used. This includes racemic mixtures can also be used.

The poly(hydroxy carboxylic acid) may optionally comprise one or more comonomer(s).

The comonomer can be a second different hydroxycarboxylic acid as defined above in Formula I. The weight percentage of each hydroxycarboxylic acid is not particularly limited.

The comonomer can also comprise dibasic carboxylic acids and dihydric alcohols. These react together to form aliphatic esters, oligoesters or polyesters as shown in Formula II having a free hydroxyl end group and a free carboxylic acid end group, capable of reacting with hydroxy carboxylic acids, such as lactic acid and polymers thereof.

Formula II wherein
R11 and R12 are branched or linear alkylenes comprising from 1 to 12 carbon atoms and can be the same or different;
"t" represents the number of repeating units T and is any integer of at least 1

These copolymers are also within the scope of the invention. The sum of the number of repeating units "r" (Formula I) and "t" (Formula II) is any integer from 30 to 15000. The weight percentages of each monomer i.e. the hydroxycarboxylic acid monomer and the aliphatic ester, oligoester or polyester comonomer of Formula II are not particularly limited. Preferably, the poly(hydroxy carboxylic acid) comprises at least 50 wt % of hydroxycarboxylic acid monomers and at most 50 wt % of aliphatic ester, oligoester or polyester comonomers.

The dihydric alcohols and the dibasic acids that can be used in the aliphatic polyester unit as shown in Formula II are not particularly limited. Examples of possible dihydric alcohols include ethylene glycol, diethylene glycol, triethyleneglycol, propylene glycol, dipropylene glycol, 1,3-butanediol, 1,4- butanediol, 3-methyl-1,5-pentanediol, 1,6-hexanediol, 1,7-octanediol, 1,9-nonanediol, neopentyl glycol, 1,4-cyclohexanediol, isosorbide and 1,4-cyclohexane dimethanol and mixtures thereof.

Aliphatic dibasic acids include succinic acid, oxalic acid, malonic acid, glutaric acid, adipic acid, pimelic acid, suberic acid, azelaic acid, sebacic acid; undecanoic dodecanic diacid and 3,3-dimethylpentanoic diacid, cyclic dicarboxylic acids such as cyclohexanedicarboxylic acid and mixtures thereof. The dibasic acid residue in the hydroxy carboxylic acid copolymer can also be derived from the equivalent diacylchlorides or diesters of the aliphatic dibasic acids.

In the case of asymmetric carbon atoms within the dihydric alcohol or the dibasic acid, each of the D-form and the L-form as well as mixtures of both may be used. This includes racemic mixtures.

The copolymer can be an alternating, periodic, random, statistical or block copolymer.

Polymerisation can be carried out according to any method known in the art for polymerising hydroxy carboxylic acids. Polymerisation of hydroxy carboxylic acids and their cyclic dimers is carried out by polycondensation or ring-opening polymerisation, respectively.

Copolymerisation of hydroxycarboxylic acids can be carried out according to any method known in the art. The hydroxycarboxylic acid can be polymerised separately prior to copolymerisation with the comonomer or both can be polymerised simultaneously.

In general, the poly(hydroxy carboxylic acid), homo- or copolymer (copolymerised with a second different hydroxy carboxylic acid or with an aliphatic ester, oligoester or polyester as described above), may also comprise branching agents. These poly(hydroxy carboxylic acid)s can have a branched, star or three-dimensional network structure. The branching agent is not limited so long as it comprises at least three hydroxyl groups and/or at least three carboxyl groups. The branching agent can be added during polymerisation. Examples include polymers such as polysaccharides, in particular cellulose, starch, amylopectin, dextrin, dextran, glycogen, pectin, chitin, chitosan and derivates thereof. Other examples include aliphatic polyhydric alcohols such as glycerine, pentaerythritol, dipentaerythritol, trimethylolethane, trimethylolpropane, xylitol, inositol and the like. Yet another example of a branching agent is an aliphatic polybasic acid. Such acids include cyclohexanehexacarboxylic acid, butane-1,2,3,4-tetracarbolic acid, 1,3,5-pentane-tricarboxylic acid, 1,1,2-ethanetricarboxylic acid and the like.

The total molecular weight of the poly(hydroxy carboxylic acid) depends on the desired mechanical and thermal properties and mouldability of the final resin composition. It is preferably from 5,000 to 1,000,000 g/mol, more preferably from 10,000 to 500,000 g/mol and even more preferably from 35,000 to 200,000 g/mol. Most preferably the total molecular weight of the polymer is from 50,000 to 150,000 g/mol.

The molecular weight distribution is generally monomodal. However, in the case of mixtures of two or more fractions of poly(hydroxy carboxylic acid)s of different weight average molecular weight and/or of different type, the molecular weight distribution can also be multimodal e.g. bi- or trimodal.

From a standpoint of availability, transparency, renewable resources and compostability the poly(hydroxy carboxylic acid) is preferably a poly(lactic acid) (PLA). Preferably, the PLA is a homopolymer obtained either directly from lactic acid or from lactide, preferably from lactide.

The Polypropylene

The polypropylenes used in this invention are prepared using single-site catalysts, preferably metallocene catalysts.

The term "polypropylene" herein includes homopolymers and copolymers having α-olefin comonomers. The term "polypropylene" herein also includes blends of two or more polypropylenes as defined below.

If the polypropylene is a copolymer, the comonomer can be any α-olefin i.e. any 1-alkylene comprising from 2 to 12 carbon atoms (except propylene itself), for example, ethylene, 1-butene, 1-pentene and 1-hexene. The copolymer can be an alternating, periodic, random, statistical or block copolymer.

Preferably, the polypropylene used in the resin composition of the invention is a homopolymer or a copolymer of propylene and ethylene.

Propylene is polymerised at low-pressure in the presence of a single-site catalyst. Preferably, the catalyst is a metallocene catalyst. If required, more than one catalyst of the same or different type can be used, either simultaneously in one reactor, in two parallel reactors or in two reactors connected to each other in series, to obtain multimodal or broader molecular weight distributions.

The polypropylene can be syndiotactic, isotactic or atactic. Isotactic polypropylenes can be obtained using Ziegler-Natta catalysts or appropriate single-site catalysts (in particular metallocene catalysts). Syndiotactic and atactic polypropylenes are obtainable using appropriate single-site catalysts (in particular metallocene catalysts). Isotactic polypropylene is generally selected.

The overall properties of the polypropylene are dependent on the method and type of single-site catalyst used. A single-site catalyst is for example a metallocene catalyst or a constrained geometry catalyst. It has been found that poly(hydroxy carboxylic acid)s are more miscible with single-site catalysed polypropylene, in particular metallocene-catalysed polypropylene, than those blended with Ziegler-Natta polypropylene. Blends of single-site catalysed polypropylenes, in particular metallocene-catalysed polypropylenes, with poly(hydroxy carboxylic acid)s are very homogeneous and do not require any compatibilisation. Examples of suitable polypropylenes prepared with single-site catalysts include those catalysed by one or more of the following metallocenes: dimethylsilyl-bis(2-methyl-4-phenylindenyl) zirconium dichloride, dimethylsilyl-bis(2-methylindenyl) zirconium dichloride, dimethylsilyl-bis(2-methyl-4,5-benzoindenyl)zirconium dichloride, isopropylidene (cyclopentadienyl)(fluorenyl)zirconium dichloride, isopropylidene(2-methyl-4-tert-butyl-cyclopentadienyl) (fluorenyl)zirconium dichloride and isopropylidene(2-methyl-4-tert-butyl-cyclopentadienyl)(3,6-di-tert-butyl-fluorenyl)zirconium dichloride.

Compared to other polypropylenes, single-site catalysed polypropylenes, in particular metallocene-catalysed polypropylenes, have a much narrower molecular weight distribution. Preferably, the molecular weight distribution is at most 10, preferably at most 7, more preferably at most 5, most preferably at most 4. The narrow molecular weight distribution is compatible with the similarly narrow molecular weight distribution of poly(hydroxy carboxylic acid)s.

Without wishing to be bound by theory, it is thought that the molecular structure of single-site catalysed polypropylenes, in particular metallocene-catalysed polypropylenes, induces a better compatibility with poly(hydroxy carboxylic acid)s as well. These polypropylenes show no or very little long chain branching. The incorporation of comonomers, if present, occurs very regularly along the polypropylene's backbone resulting in a highly uniform distribution of comonomers i.e. regular short chain branching. This effect (known as very narrow "short chain branching distributions" (SCBD)) in polypropylene is specific to single-site catalysed polypropylenes, in particular metallocene-catalysed polypropylenes. As a result, during crystallization from the melt, very small crystallites are formed throughout the material, thus providing excellent optical clarity. Ziegler-Natta-catalysed polypropylenes on the other hand, have a poor and very random comonomer incorporation, therefore a broad distribution of different sizes of crystallites occurs during crystallisation, resulting in high haze values.

The Applicant believes, without wishing to be bound by theory, that since the molecular architecture of poly(hydroxy carboxylic acid)s is similar to that of single-site catalysts (in particular metallocene catalysts), i.e. narrow molecular weight distribution, poly(hydroxy carboxylic acid)s are more compatible with single-site catalysed polypropylenes, in particular metallocene-catalysed polypropylenes, than with other polypropylenes.

Additionally, additives can be included in one or more components of the blend, they can be added during blending, and/or they can be included in a product formed from the blend, such as a film, as desired. Such additives are well known in the art, and can include, for example: antioxidants (e.g., hindered phenolics such as IRGANOX™ 1010 or IRGANOX™ 1076 available from Ciba™); phosphites (e.g., IRGAFOS™ 168 available from Ciba™); anti-cling additives; tackifiers, such as polybutenes, terpene resins, aliphatic and aromatic hydrocarbon resins, alkali metal and glycerol stearates and hydrogenated rosins; UV stabilizers; heat stabilizers; anti-blocking agents; release agents; anti-static agents; pigments; colorants; carbon black; dyes; waxes; silica; fillers; talc, anti-acid compounds; peroxides; grafting agents; lubricants; clarifying agents; nucleating agents and the like.

Blending of Poly(Hydroxy Carboxylic Acid) with Polypropylene

The blending of the poly(hydroxy carboxylic acid) with the polypropylene, prepared with a single-site catalyst, can be carried out according to any physical blending method and combinations thereof known in the art, dry blending, wet blending or melt blending. The blending conditions depend upon the blending technique and polypropylene involved. Depending on the method, the polypropylene and the poly (hydroxy carboxylic acid) can be in any appropriate form, for example, fluff, powder, granulate, pellet, solution, slurry, and/or emulsion.

If dry blending of the polymer is employed, the dry blending conditions may include temperatures from room temperature up to just under the melting temperature of the polymer. The components can be dry blended prior to a melt blending stage, which can take place for example in an extruder.

Melt processing is fast and simple and makes use of standard equipment of the thermoplastics industry. The components can be melt blended in a batch process such as with a Banbury, Haake or Brabender Internal Mixer or in a continuous process, such as with an extruder e.g. a single or a twin screw extruder. During melt blending, the temperature at which the polymers are combined in the blender will generally be in the range between the highest melting point of the polymers employed and up to about 80° C. above such melting point, preferably between such melting point and up to 30° C. above such melting point. The time required for the melt blending can vary broadly and depends on the method of blending employed. The time required is the time sufficient to thoroughly mix the components. Generally, the individual polymers are blended for a time of at least 10 seconds, preferably of about 10 seconds up to about 10 minutes, preferably up to about 5 minutes, more preferably up to about 2 minutes.

The components can also be wet blended whereby at least one of the components is in solution or slurry form. If solution blending methods are employed, the blending temperature will generally be 25° C. to 50° C. above the cloud point of the solution involved. The solvent or diluent is then removed by evaporation to leave behind a homogeneous blend of poly (hydroxy carboxylic acid) and polypropylene.

According to an embodiment, the resin composition comprises at least 0.1% and less than 50% by weight of poly (hydroxy carboxylic acid) and at least 50% by weight of polypropylene, preferably more than 50% by weight of polypropylene.

More preferably, the resin composition comprises from 0.1 to 49.9 wt % of poly(hydroxy carboxylic acid), preferably from 0.1 to 30 wt %, more preferably from 0.1 to 20 wt %, even more preferably from 0.1 to 15 wt % and most preferably from 0.1 to 10 wt %. The resin composition comprises from 50 to 99.9 wt % of polypropylene, preferably from 70 to 99.9 wt %, more preferably from 80 to 99.9 wt %, even more preferably from 85 to 99.9 wt % and most preferably from 90 to 99.9 wt %.

Preferably, the resin composition essentially consists of polypropylene and poly(hydroxy carboxylic acid) i.e. at least 0.1 and less than 50 wt % of poly(hydroxy carboxylic acid) and 50 to 99.9 wt % of polypropylene.

In a preferred embodiment, according to the invention, the composition does not require compatibiliser for compatibilising polypropylene and poly(hydroxy carboxylic acid) i.e. it is free of such compatibilisation agents.

The resin composition according to the invention can also be used in blends with other resin compositions to be used in the same applications as mentioned in the following section.

The content of poly(hydroxy carboxylic acid) within the composition of the invention renders it partially compostable.

Compostability is herein defined as provided by the standard EN 13432:2000. In order for packaging material to be biodegradable it must have a lifecycle, which can be described as follows:

a period of storage and/or use starting from time $t_0$, which is the moment the material comes off the production line;

a period of disintegration starting at time $t_1$, during which the polymer begins to significantly chemically disintegrate e.g. via the hydrolysis of ester bonds;

a period of biodegradation, during which the partly hydrolysed polymer biologically degrades as a result of the action of bacteria and micro organisms;

It is important to make the distinction between degradable, biodegradable and compostable as often these terms are used interchangeably. In addition to the above, a compostable plastic is "capable of undergoing biological decomposition in a compost site as part of an available program, such that the plastic is not visually distinguishable and breaks down to carbon dioxide, water, inorganic compounds, and biomass, at a rate consistent with known compostable materials (e.g. cellulose) and leaves no toxic residue" (ASTM). On the other hand a degradable plastic is one which is merely chemically changed i.e. there is no requirement for the plastic to be biologically degraded by microorganisms. Therefore, a degradable plastic is not necessarily biodegradable and a biodegradable plastic is not necessarily compostable (that is, it breaks down too slowly and/or leaves toxic residue).

In particular, the EN 13432:2000 standard for compostability has the following main features:

Disintegration is measured by sieving the material to determine the biodegraded size. To be considered compostable, less than 10% of the material should be larger than 2 mm in size.

Biodegradability is determined by measuring the amount of carbon dioxide produced over a certain time period by the biodegrading plastic. To be considered compostable, it must be 90% biodegraded within 90 days.

Eco-toxicity is measured by determining whether the concentration of heavy metals is below the limits set by the standard and by testing plant growth by mixing the compost with soil in different concentrations and comparing it with controlled compost.

Applications of the Resin Composition

Due to the improved mechanical properties of the resin composition stemming from the presence of polypropylene, as well as the presence of material from renewable resources and compostability of the resin composition resulting from the presence of poly(hydroxy carboxylic acid), it is suitable for a wide variety of applications, including films and moulding applications, as described below.

The resin composition is particularly suitable for transformation into a film, for example cast, blown, uni-oriented and bi-oriented film. It has been surprisingly found that films formed from polymer blends of the invention exhibit improved properties, particularly improved dart impact properties and tensile strengths, relative to films of 100% poly(hydroxy carboxylic acid). Films comprising the resin composition of the invention have improved printability in comparison to films consisting only of polypropylene due to the higher surface tension of poly(hydroxy carboxylic acid)s, like PLA. The films according to the invention also have increased thermal and high frequency sealability in comparison to 100% polypropylene films. The films provide higher hot-tack strengths in comparison to polypropylene-based films. The presence of poly(hydroxy carboxylic acid)s also increases the stiffness of the film and provides enhanced water breathability in comparison to polypropylene alone. The film also has improved barrier properties against atmospheric gases, in particular oxygen, carbon dioxide and nitrogen in comparison to films consisting solely of polypropylene.

The polymer blends of the invention can be used to form cast or blown films having a single layer (monolayer films) or multiple layers (multilayer films). When used in multilayer films, the polymer blends according to the invention can be used in any layer of the film, or in more than one layer of the film, as desired. When more than one layer of the film is formed using a polymer blend of the present invention, each such layer can be individually formulated, i.e. the layers formed can be the same or different in chemical composition, density, melt index, thickness and so on, depending upon the desired properties of the film. The other layer(s) can include resins comprising only poly(hydroxy carboxylic acid), for example PLA, or only a polypropylene, or also resins comprising, for example, high-pressure polymerised low-density polyethylene (LDPE), LLDPE, MDPE or HDPE. Further, one skilled in the art will understand that the layers of a multilayer film must have the appropriate viscosity match.

The thickness of each layer of the film and of the overall film, are not particularly limited, but are determined according to the desired properties of the film. Typical film layers have a thickness of about 1 to 1000 μm, more typically about 5 to 100 μm, and typical films have an overall thickness of 5 to 200 μm, more typically 5 to 100 μm.

Preferably, the present invention provides a single-layer (monolayer) film formed using any of the polymer blends of the invention. According to another embodiment this film is to 150 μm thick.

The films of the present invention may be formed by any number of well-known extrusion or co-extrusion techniques. Any of the blown or chill roll techniques commonly used are suitable. For example, the composition can be extruded in a molten state through a flat die and then cooled to form a film. Alternatively, the composition can be extruded in a molten state through an annular die and then blown and cooled to form a tubular, blown film, which can then be axially slit and unfolded to form a flat film.

As a specific example, cast films can be prepared using a pilot scale commercial cast film line machine as follows. Pellets of the polymeric blend are melted at temperatures ranging from about 220° C. to about 270° C., with the specific melt temperature being chosen to match melt viscosities of the various resins. The flow is then extruded through a single manifold film extrusion die to the desired width. The die gap opening is typically about 600 μm. The material is then drawn down to the final gauge. A vacuum box or air knife can be used to pin the melt exiting the die opening to a primary chill roll maintained at a temperature less than 35° C., preferably at about 32° C.

As another example, blown films can be prepared as follows. The film can be for instance produced using a blown film line using a die with a die gap of 1.0-2.0 mm, a die diameter of 1-100 mm, preferably 50 mm and a length to diameter ratio (L/D) of 25. The blow-up ratio (BUR) can range from 1.0 to 10.0, preferably from 1.0 to 5.0, more preferably 1.3-3.5. The film can then be extruded through the die into a film and cooled, for example by blowing air onto the surface of the film. In industrial processes, the film is then preferably drawn from the die to form a cylindrical film that is cooled, collapsed and optionally subjected to a desired auxiliary process, such as slitting, treating, sealing or printing. The finished film can be wound into rolls for later processing and converting.

Multiple-layer films may be formed by methods well known in the art. The materials forming each layer may be coextruded through a co-extrusion feedblock and die assembly to yield a film with two or more layers adhered together but differing in composition. Co-extrusion can be adapted to the cast film or the blown film processes. Multiple-layer films may also be formed by extrusion coating, whereby a substrate material is contacted with the hot molten polymer as the polymer exits the die.

There are many potential applications for the films produced from the polymer blends described herein. These films can be made into other forms, such as tape, by any one of a number of well-known cutting, slitting, and/or rewinding techniques. They may be useful as stretch, sealing, or oriented films. Surface tension is improved in relation to polypropylene films. However, the surface tension can be improved even further by any known and conventional post-forming techniques such as corona discharge, chemical treatment, flame treatment, and the like.

Films according to the invention can be used as cling films, stretch films, shrink films, bags, lamination films, liners, diaper films, candy wrappers or for a variety of other suitable end-use applications that will be apparent to those skilled in the art. The films can also be applied in packaging material, such as for bundling and unitizing a variety of products; flexible food packaging, including frozen food packaging; bags, such as trash bags and bin liners, industrial liners, shipping sacks and produce bags; and surface protection applications, with or without stretching, such as in the temporary protection of surfaces during manufacturing or transportation.

The composition is also suitable for typical injection, extrusion, stretch and injection stretch blow moulding applications, but also thermoforming, foaming and rotational moulding applications. In particular, the addition of poly (hydroxy carboxylic acid)s improve the mechanical properties of injection moulded articles of polypropylene. In particular, rigidity is increased. The articles made according to these processes can be mono- or multilayer, at least one of the layers comprising the resin composition of the invention.

The person skilled in the art is aware that the suitable melt flow range of the resin composition depends upon the respective method of forming an article. Thus, for injection stretch blow molding (ISBM) the preferred melt flow index range is from 1.5 dg/min to 30 dg/min. For cast film extrusion the preferred melt flow index range is from 3.0 dg/min to 15 dg/min. For blown film extrusion the preferred melt flow index range is from 0.3 dg/min to 3.0 dg/min. For blow molding the preferred melt flow index range is from 0.3 dg/min to 3.0 dg/min. For sheet extrusion the preferred range is from 2.0 dg/min to 10 dg/min. For injection molding the preferred range is from 10 dg/min to 100 dg/min.

The following are non-limiting examples illustrating the invention.

EXAMPLES

The PLA used in the examples is PLA Terramac® 6201. The properties of this PLA are provided in Table 1 below.

TABLE 1

| | PLA |
|---|---|
| Density/g/cm$^3$ | 1.26 at 23° C. |
| Melt index/g/10 min | 9-10 at 233 ppm H$_2$O |
| | 18-20 at 1000 ppm H$_2$O |
| MW/Da | 106940 |
| MWD | 1.75 |

Densities of the PLA were measured according to ASTM D 1505.

Melt indices for PLA were measured according to ASTM D 1238, i.e. at 190° C. using a load of 2.16 kg, carried out once in the presence of 233 ppm water and once in the presence of 1000 ppm water.

MW and MWD for PLA were determined using GPC, where the PLA was dissolved in choloform and measurements were taken at 25° C.

Cast Films

Cast films were prepared using a pilot scale commercial cast film line machine as follows. Compounded and dry blends of 90 wt % metallocene-catalysed polypropylene with 10 wt % of poly(lactic acid) PLA Terramac® 6201 were prepared. The pellets of the polymeric blend were melted. The flow was then extruded through a single manifold film extrusion die at a temperature of about 40° C. to the desired width. The die gap opening was about 600 μm. The material was then drawn down to the final gauge. The melt exiting the die opening to a primary chill roll was maintained at about 32° C.

Films 1-7 had a film thickness of about 50 μm.

The metallocene catalysed polypropylene mPP A is a homopolymer polypropylene resin having a melt index of 15 g/10 min as measured according to ISO 1133, condition L, at a temperature of 230° C. under a load of 2.16 kg The metallocene catalysed polypropylene mPP B is a homopolymer polypropylene resin having a melt index of 25 g/10 min as measured according to ISO 1133, condition L, at a temperature of 230° C. under a load of 2.16 kg.

ZnPP is a Ziegler-Natta catalysed polypropylene.

The results are provided in Tables 2 and 3. Table 2 clearly shows the improvements of the resin composition comprising mPP A in comparison with the composition comprising znPP. Particularly the tensile strengths are improved.

Figure 1:
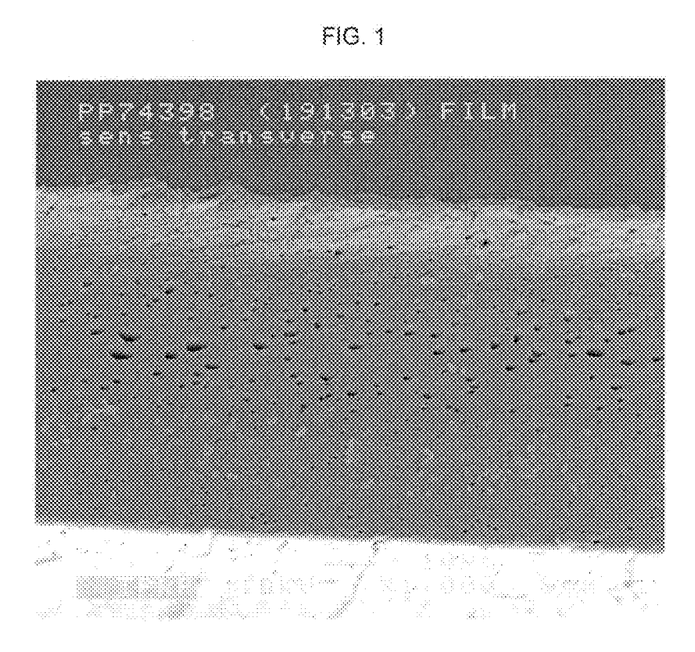
FIG. 1 shows scanning electron microscope (SEM) image of the microstructure of a cast film according to the invention comprising a metallocene-catalysed polypropylene (mPP) and PLA.
Figure 2:
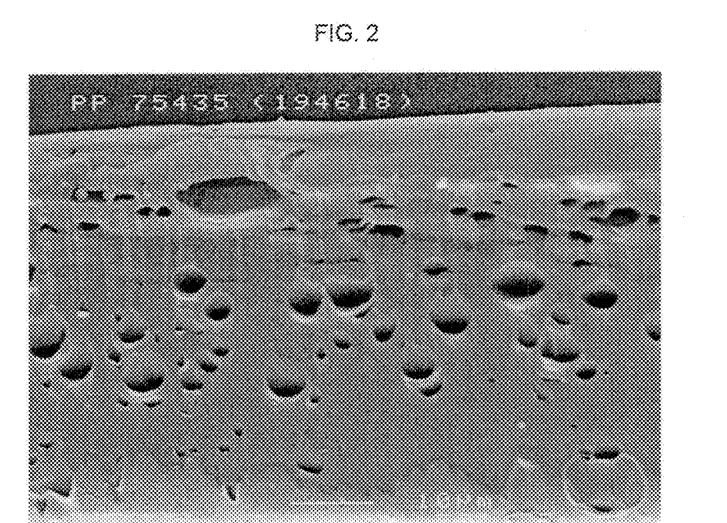
FIG. 2 shows an SEM image of the microstructure of a cast film comprising Ziegler-Natta catalysed (znPP) and PLA.

The SEM of films 3 and 4 are represented by FIGS. 1 and 2, respectively.

TABLE 2

| | | Film 1 Compounded 90 wt % mPP A + 10 wt % PLA | Film 2 Compounded 90 wt % mPP A + 10 wt % PLA | Film 3 Dry blend of 90 wt % mPP A + 10 wt % PLA | Film 4 Dry blend of 90 wt % znPP + 10 wt % PLA | Film 5 mPP A |
|---|---|---|---|---|---|---|
| Processing parameters | | | | | | |
| Rolls Temperature | ° C. | 40 | 25 | 25 | 25 | 25 |
| Rolls Speed | m/min | 6 | 4 | 4 | 4 | 4 |
| Film Properties | | | | | | |
| Haze | % | 38 | 21 | 25 | 29 | 1.2 |
| Gloss 45° | % | 41 | 60 | 55 | 46.8 | 89 |
| Average dart impact | g | <20 | <20 | <20 | <20 | 244 |
| Tensile | | | | | | |
| Strength at yield MD | MPa | 24 | 29 | 29 | 18 | 25 |
| Strength at break MD | MPa | 45 | 16 | 30 | 10 | 35 |
| Elongation at break MD | % | 695 | 233 | 321 | 188 | 522 |
| Strength at yield TD | MPa | 18 | 25 | 20 | 10 | 25 |

TABLE 2-continued

|  |  | Film 1 Compounded 90 wt % mPP A + 10 wt % PLA | Film 2 Compounded 90 wt % mPP A + 10 wt % PLA | Film 3 Dry blend of 90 wt % mPP A + 10 wt % PLA | Film 4 Dry blend of 90 wt % znPP + 10 wt % PLA | Film 5 mPP A |
|---|---|---|---|---|---|---|
| Strength at break TD | MPa | 20 | 18 | 22 | 6 | 39 |
| Elongation at break TD | % | 444 | 15 | 170 | 21 | 573 |

Figure 3:
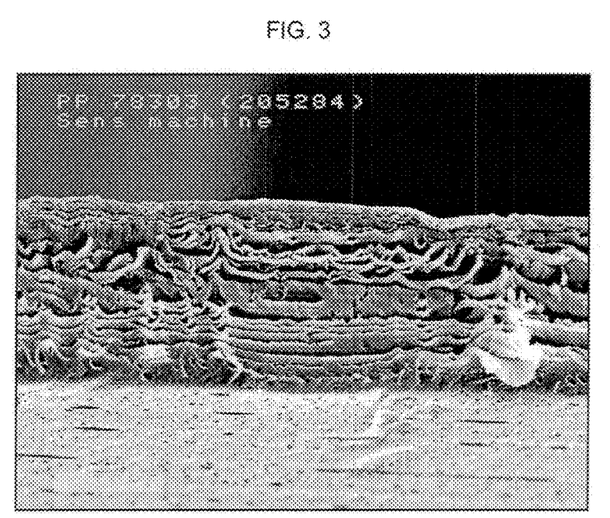
FIG. 3 shows an SEM image of a film comprising mPP and PLA.

The SEM of film 6 is shown in FIG. 3. It clearly demonstrates the excellent dispersion of the PLA lamellas in the polypropylene resin.

TABLE 3

|  |  | Film 6 Compounded 90 wt % mPP B + 10 wt % PLA | Film 7 mPP B |
|---|---|---|---|
| Processing parameters |  |  |  |
| Rolls Temperature | °C. | 25 | 25 |
| Rolls Speed | m/min | 4 | 4 |
| Film Properties |  |  |  |
| Haze | % | 18.1 | 0.1 |
| Gloss 45° | % | 68.8 | 90.3 |
| Average dart impact | g | <20 | 105 |
| Elmendorf tear resistance |  |  |  |
| MD | N/mm | 13.9 | 17.0 |
| Tensile |  |  |  |
| Strength at yield MD | MPa | 28 | 24 |

Elmendorf tear strength was measured in the machine direction (MD) according to ASTM D 1922

Dart impact strength (Dart) was measured according to ASTM D 1709.

Measurements for tensile strength at yield in the machine direction (MD) and in the transverse direction (TD) were carried out according to ASTM D 882-02.

Gloss was measured according to ASTM D 2457 at an angle of 45°.

Haze was measured according to ISO 14782.

Injection Moulding

Table 4 shows the results obtained from injection moulding, according to the processing parameters provided therein, a compounded resin composition containing mPP A and PLA in comparison with injection moulding of the mPP A resin alone. It clearly demonstrates the improvements in mechanical properties obtained by using PLA in mPP resins.

The metallocene catalysed polypropylene mPP A is a homopolymer polypropylene resin having a melt index of 15 g/10 min as measured according to ISO 1133, condition L, at a temperature of 230° C. under a load of 2.16 kg.

TABLE 4

|  |  | Sample 1 Compounded 90 wt % mPP A + 10 wt % PLA | Sample 2 mPP A |
|---|---|---|---|
| Processing parameters |  |  |  |
| Melt temperature | °C. | 230 | 200 |
| Dynamic pressure | bar | 287 | 466 |
| Holding pressure | bar | 320 | 520 |
| Mechanical Properties |  |  |  |
| Elastic modulus | MPa | 1576 | 1433 |
| Modulus at 1% | MPa | 1423 | 1257 |
| Flexural modulus | MPa | 1462 | 1311 |
| Notched Izod at 23° C. | kJ/m$^2$ | 2.8 | 3.4 |

Flexural modulus was measured according to ISO 178.

Notched Izod impact strength was measured according to ISO 180.

Figure 4:
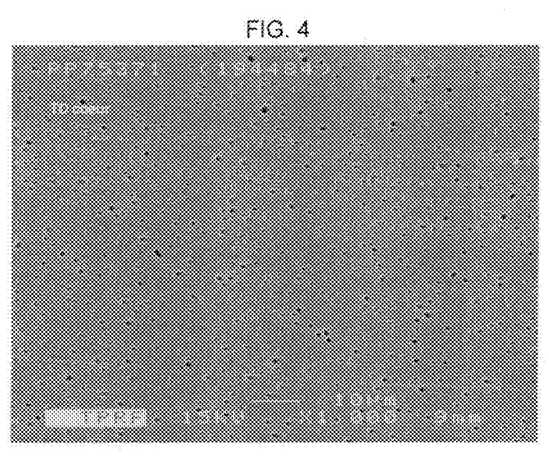
FIG. 4 shows an SEM image of the surface of an injection moulded sample comprising mPP and PLA.
Figure 5:
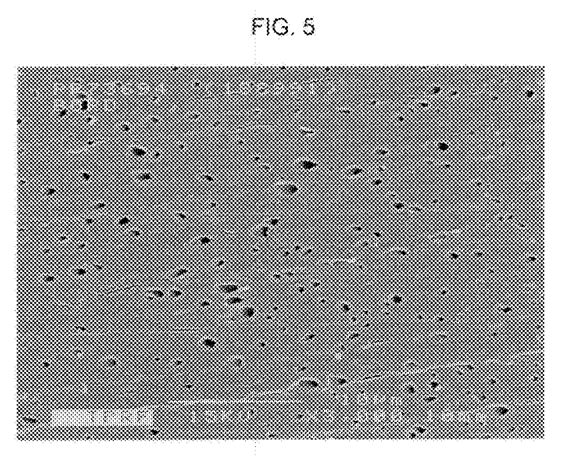
FIG. 5 shows an SEM image of the surface of an injection moulded sample comprising znPP and PLA.

FIGS. 4 and 5 are SEM images of injected moulded samples of 90 wt % mPP A and 10 wt % PLA (Sample 3) and 90 wt % znPP and 10 wt % PLA (Sample 4). The nodes of PLA in Sample 3 have a diameter of on average only 0.7 µm in size, whereas the nodes of PLA in Sample 4 have a diameter of on average 1.4 µm in size i.e. double the size. Thus it can be said that PLA disperses more easily in polypropylene prepared with a metallocene catalyst than in polypropylene prepared with a Ziegler-Natta catalyst. The resin composition of mPP and PLA is more homogeneous.

The invention claimed is:

1. A resin composition comprising at least 0.1% by weight of poly(hydroxy carboxylic acid) and at least 50% by weight of polypropylene prepared with a single-site metallocene catalyst.

2. The composition of claim 1, wherein the composition is free of compatibiliser for compatibilising polypropylene and poly(hydroxy carboxylic acid).

3. The composition of claim 1, wherein the polypropylene is isotactic.

4. The composition of claim 1, wherein a molecular weight distribution of the polypropylene resin is at most 5.

5. The composition of claim 1, wherein the poly(hydroxy carboxylic acid) is poly(lactic acid).

6. The composition of claim 1, wherein the poly(lactic acid) is a copolymer and the comonomers are chosen from one or more of:
   aliphatic hydroxy carboxylic acids selected from glycolic acid, 3-hydroxybutyric acid, 4-hydroxybutyric acid, 4-hydroxyvaleric acid, 5-hydroxyvaleric acid, 6-hydroxycaproic acid and combinations thereof; and
   aliphatic polyesters of dihydric alcohols and dibasic carboxylic acids.

7. A process for preparing the resin composition of claim 1 comprising blending polypropylene prepared with a single-site metallocene catalyst and poly(hydroxy carboxylic acid) together.

8. A film formed from the resin composition of claim 1, wherein the film exhibits improved pritability.

9. The resin composition of claim 1, wherein the resin exhibits improved gas barrier properties over compositions formed in the absence of the poly(hydroxy carboxylic acid).

10. The resin composition of claim 1, wherein the resin exhibits improved water breathability over compositions formed in the absence of the poly(hydroxy carboxylic acid).

11. The resin composition of claim 1, wherein the single-site metallocene catalyst comprises: dimethylsilyl-bis(2-methyl-4-phenylindenyl)zirconium dichloride, dimethylsilyl-bis(2-methylindenyl)zirconium dichloride, dimethylsilyl-bis(2-methyl-4,5-benzoindenyl)zirconium dichloride, isopropylidene(cyclopentadienyl)(fluorenyl)zirconium dichloride, isopropylidene(2-methyl-4-tert-butyl-cyclopentadienyl)(fluorenyl)zirconium dichloride, isopropylidene(2-methyl-4-tert-butyl-cyclopentadienyl)(3,6-di-tert-butyl—fluorenyl)zirconium dichloride, or combinations thereof.

12. The resin composition of claim 1, wherein the resin composition comprises: from 0.1 to 49.9 wt % of the poly(hydroxy carboxylic acid) and from 50 to 99.9 wt % of the polypropylene.

13. The resin composition of claim 1, wherein the resin composition comprises: from 0.1 to 30 wt % of the poly(hydroxy carboxylic acid) and from 70 to 99.9 wt % of the polypropylene.

14. The resin composition of claim 1, wherein the resin composition comprises: from 0.1 to 20 wt % of the poly(hydroxy carboxylic acid) and from 80 to 99.9 wt % of the polypropylene.

15. The resin composition of claim 1, wherein the resin composition comprises: from 0.1 to 15 wt % of the poly(hydroxy carboxylic acid) and from 85 to 99.9 wt % of the polypropylene.

16. The resin composition of claim 1, wherein the resin composition comprises: from 0.1 to 10 wt % of the poly(hydroxy carboxylic acid) and from 90 to 99.9 wt % of the polypropylene.

* * * * *